No. 626,103. Patented May 30, 1899.
R. J. SEVIER.
COMBINED CORN AND COTTON SCRAPER, CHOPPER, AND CULTIVATOR.
(Application filed Mar. 2, 1899.)
(No Model.)
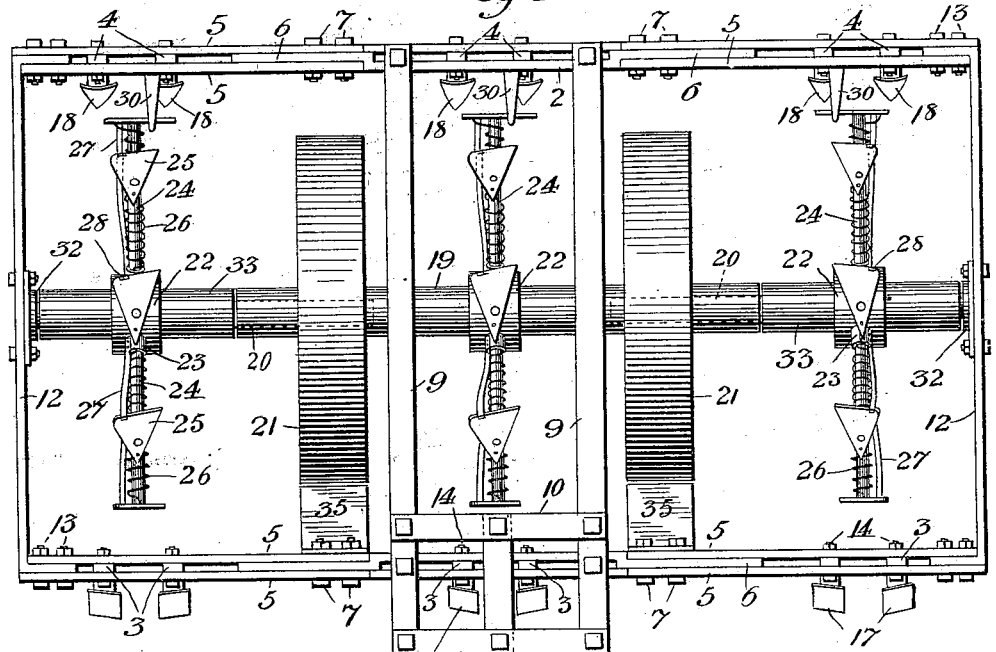
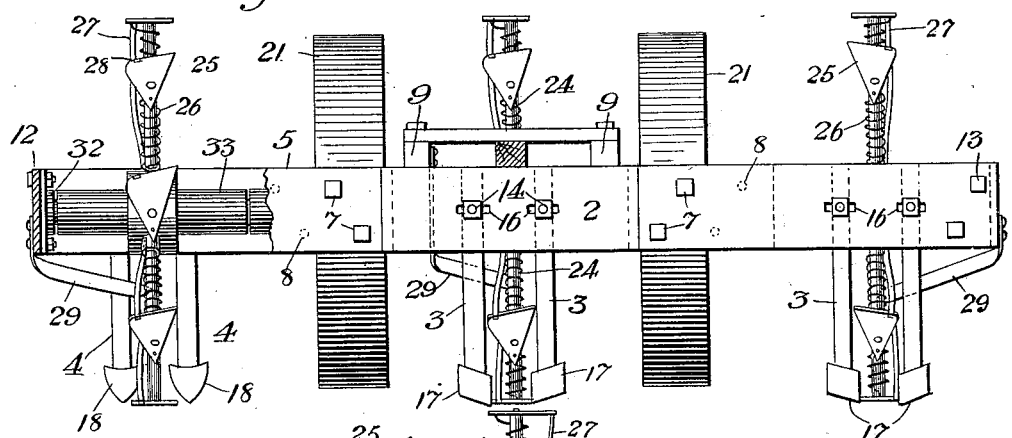
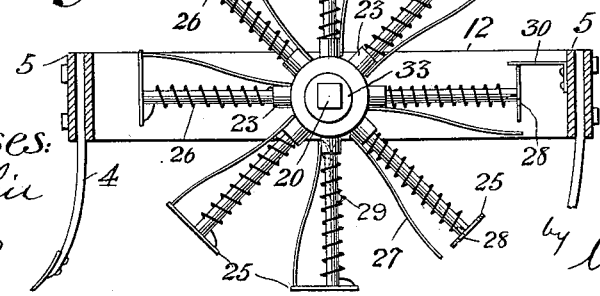
Witnesses:
Inventor.
Robert J. Sevier,
by W. A. Redmond,
Atty

United States Patent Office.

ROBERT J. SEVIER, OF SAVANNAH, TENNESSEE.

COMBINED CORN AND COTTON SCRAPER, CHOPPER, AND CULTIVATOR.

SPECIFICATION forming part of Letters Patent No. 626,103, dated May 30, 1899.

Application filed March 2, 1899. Serial No. 707,443. (No model.)

*To all whom it may concern:*

Be it known that I, ROBERT J. SEVIER, a citizen of the United States, residing at Savannah, in the county of Hardin and State of Tennessee, have invented certain new and useful Improvements in a Combined Corn and Cotton Scraper, Chopper, and Cultivator; and I do declare the following to be a full, clear, and exact description of the invention, such as will enable others skilled in the art to which it appertains to make and use the same.

This invention relates generally to cultivators, and particularly to a combined cotton or corn scraper, chopper, and cultivator; and it has for its object to provide a simple, durable, and comparatively inexpensive machine, the parts of which are adapted for adjustment as may be required by the character of the crop upon which it is employed; and it consists of the parts and combinations of parts hereinafter described and claimed.

In the accompanying drawings, forming a part of this specification, Figure 1 is a plan view of my improved cultivator; Fig. 2, a front elevation showing one end of the frame broken, and Fig. 3 a detail side elevation of the hoe-wheel or spider and a portion of the supporting-frame.

Similar numerals refer to similar parts throughout all the views.

Referring to the drawings, the frame of my improved machine is shown in three sections, the middle one of which consists of the flat bars 2, bolted together so as to provide a space therebetween to receive the ends of the handles or stems 3 of the scrapers at the front of the machine and to receive the stems 4 of the shovel-plows at the rear. One of the flat bars 2 is preferably bent at right angles and then parallel, as at 6, in order to enter between the bars 5 of the end sections of the frame, as clearly shown in Fig. 1, where they are secured by means of bolts 7, said elongated bars 6 being formed with openings 8, as indicated by dotted lines, Fig. 2, in order to permit of the end frames or sections being adjusted to and from the middle section to accommodate the machine to the distance between the drills or rows being cultivated. The bars 2 at front and rear are connected by beams 9, which extend beyond the front of the machine and are connected by cross-bars 10 in order to provide means for the attachment of the tongue, seats, &c., to render the machine complete for use. The end sections of the frame each comprise the flat bars 5, spaced apart, as shown, at front and rear, and the single bar 12, connecting said front and rear bars, the ends of which are bent at right angles and enter between the bars 5 and are firmly secured by bolts 13. Between the bars 5 at the front of the machine are secured by bolts 14 passing through slots 16 in said bars the handles or stems of the scrapers 17, and the stems 4 of the shovel-plows 18 are similarly secured at the rear, whereby said scrapers and plows may be adjusted laterally, as desired. A shaft or axle 19 is provided, on which are rigidly secured the wheels 21 which support the machine, said axle or shaft having square openings in each end in order to receive the reduced and squared ends 20 (see Fig. 3, and also shown in dotted lines, Fig. 1) of short axles 33, the other ends of said axles 33 having their bearing in boxes 32, secured to the bars 12. On the axles 33 and on the axle 19 between the wheels 21 is secured a hub 22, having a series of socket-irons 23 projecting radially therefrom, into which are inserted and secured in any desired manner the handles 24 of the hoes or hoe-blades 25. The hoe-blades are arranged and so secured on the ends of the handles 24 as to be capable of easily turning thereon, and said blades are somewhat triangular in outline and are secured on the handles at or near their points, and a coiled spring 26 is secured at one end to said blades and is coiled around the stems or handles thereof and has its other end secured to said handles or stems, whereby the tendency of the spring is to turn the blades on their stems, while a flat spring 27, secured at one end of the handles or, as shown, to the socket-irons 23 and curving downwardly to the hoe-blades, engages a notch 28, formed in the broad ends of the blades in order to hold the same in their set positions, as best shown in Figs. 1 and 2, and against the tension of springs 26 until said flat springs 27 are released from the notches 28 by engagement with a tripper 29, which is secured at one end to the frame and has its free end extending into the path of said springs 27, thus leaving the blades free to respond to the action of the springs 26 and be thus quickly turned on their stems or handles. In order to reset the blades in their primary position, I provide stiff bars or trippers 30, which are secured at one end to the frame of the machine and project into the path of the blades and, engaging the same, cause them to turn on their handles or stems until the flat springs 27 again enter the notches 28 and hold them in their positions, one corner of each hoe-blade being rounded off, so as to permit of the flat springs 27 readily sliding thereon.

The machine is adapted to scrape, chop, and cultivate three rows at once and in operation is set with the wheels 21 at each side of a row, thus bringing each pair of scrapers and plows in position close to and at each side of a row, while the hoes are immediately in line with the rows on which they are to operate. The scrapers scrape the soil, grass, and weeds from the rows, and the hoes cut or chop into the rows at intervals apart to thin out the plants, while the plows following and being set a greater distance apart than the scrapers cultivate the rows. The arrangement of the hoes and the trippers 30 is such that the latter engage and operate the former the instant the same have reached and assumed a horizontal position at their highest point during the rotation of the wheel, while the trippers 29 operate when the hoes have reached their highest point. As the hoe-blades successively reach the row during the passage of the machine thereover and penetrate the soil the trippers 29, extending, as they do, into the path traversed by the flat springs 27, engage said flat springs, so as to retard the same until they are disengaged from the notches 28 in the hoe-blades, at which instant the coiled springs 26 operate to quickly turn the blades on their handles or stems, thus causing them to cut across the row and destroy any weeds or young plants growing in the path of the stroke of the blade and at the same time loosening the soil. A scraper 35 is secured to the front bars of the frame and extends to the wheels 21 in order to keep the same free of dirt.

Having thus described my invention, what I claim as new, and desire to secure by Letters Patent, is—

1. A chopper or chopping-wheel for cultivators having a series of radial stems provided with cutting-blades loosely arranged thereon, means for holding said blades in their set positions, means for releasing the same, and means for turning the same on their stems once during each half-revolution of said wheel.

2. A chopper or chopping-wheel for cultivators having a series of radial stems, cutting-blades loosely or revolubly mounted on said stems, means for holding said blades in their set positions, means for releasing said blades and springs for turning them on said stems once during each half-revolution of said wheel.

3. A chopper or chopping-wheel for cultivators comprising a hub, a series of radial stems, blades loosely arranged on said stems, springs for holding said blades in their set positions, means for releasing said blades, and means for imparting a quick throw or turn to said blades once during each half-revolution of said wheel.

4. A chopper or chopping-wheel for cultivators comprising a hub, a series of blades carried by said hub, and means for imparting a motion to said blades transverse to the plane of rotation of the wheel.

5. A chopper or chopping-wheel for cultivators, comprising a hub, a series of blades carried by said hub, springs for holding said blades in their set position, means for releasing them from such positions, springs for imparting a motion to said blades transverse to the plane of rotation of the wheel, and means for returning said blades to their set position.

6. The combination, in a cotton-cultivator, of a frame, scrapers arranged at the front of said frame, plows arranged at the rear of said frames, a main or central axle having a chopping-wheel and supporting-wheels secured thereon, short axles arranged at each end of and having one end connected to said central axle and their other ends having their bearing in the frame, and chopping-wheels mounted on said end axles.

7. The combination, in a cotton-cultivator, of a frame formed in three adjustable sections, scrapers adjustably secured to the front of said frame, plows adjustably secured to the rear of said frame, an axle or shaft formed in sections, and supporting-wheels and chopping-wheels arranged on said axle.

In testimony whereof I affix my signature in presence of two witnesses.

ROBERT J. SEVIER.

Witnesses:
 HUGH M. STERLING,
 FRANK MONTGOMERY.